Sept. 20, 1955 D. B. DOOLITTLE 2,718,367
PLANING SURFACE POSITION ACTUATING DEVICE
Filed June 22, 1951
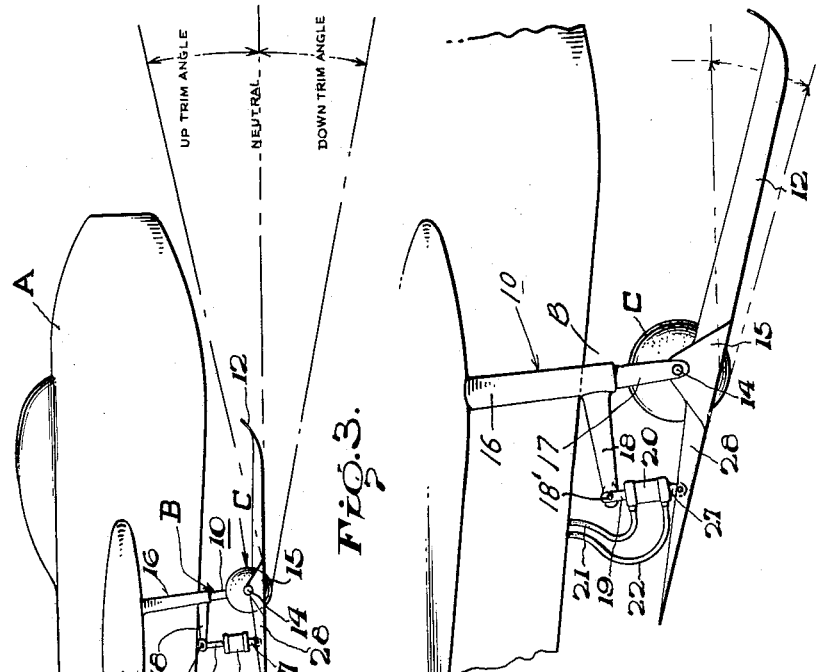
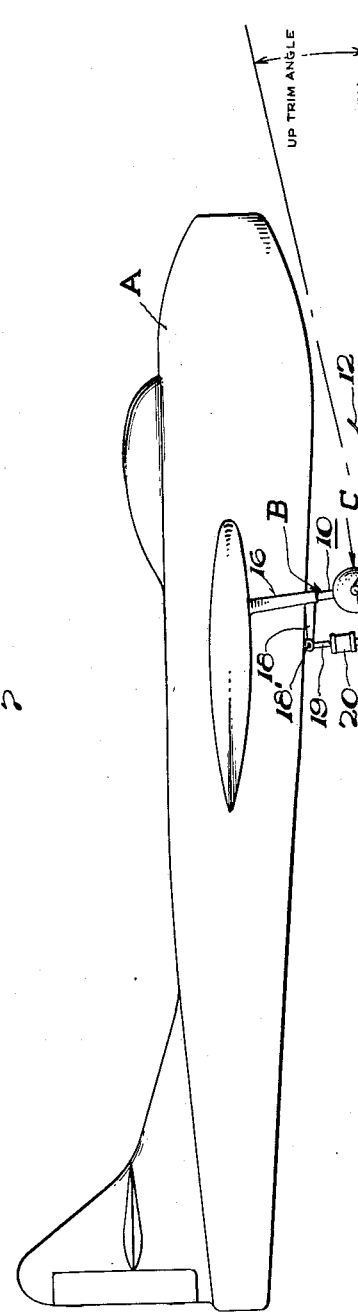
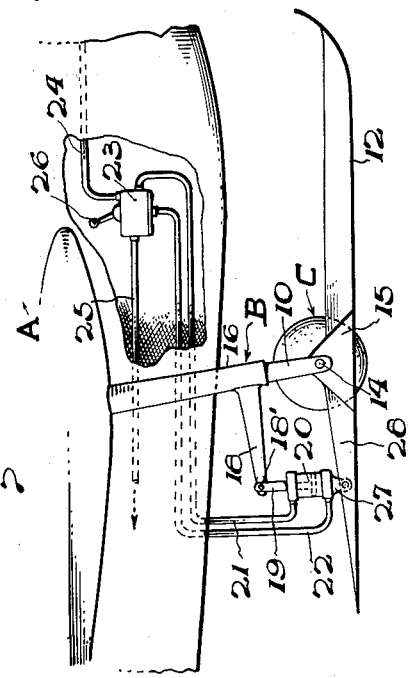
INVENTOR
Donald B. Doolittle.
BY Herbert M. Birch
ATTORNEY

United States Patent Office 2,718,367
Patented Sept. 20, 1955

2,718,367

PLANING SURFACE POSITION ACTUATING DEVICE

Donald B. Doolittle, Wilmington, Del., assignor, by mesne assignments, to All American Engineering Company, Wilmington, Del., a corporation of Delaware Application June 22, 1951, Serial No. 233,042

2 Claims. (Cl. 244—105)

The present invention relates to improvements for control of aircraft undercarriages, such as illustrated and described in prior co-pending application, Serial Number 142,654, filed February 6, 1950, now U. S. Patent No. 2,647,709 of August 4, 1953, for Planing Surfaces for Aircraft and Hydrocraft. This type of undercarriage permits safe landings on various surface mediums, as water, snow, mud, grass or any combination of these mediums. Operating aircraft from the above mentioned surface mediums or solid terrain requires that the planing surface trim be changed to the best position for the surface encountered, trim angle being controlled by angular movement of the planing surface about an axis parallel to the lateral axis of the supported aircraft.

Accordingly a general object of this invention is to provide novel means for controlling the trim angle of the planing surface of a ski or a hydro-ski for best performance on each surface medium encountered, that is, whereby the trim of the planing surface may be set for landing on water or permitted to trim freely when landing on a beach or the like.

A specific object is to provide an automatic control for adjusting and fixing the trim angle of the planing surface of skis or the like from a freely trimming condition when desired by the pilot of an aircraft from the cockpit.

Still another object is to provide with a wheel and a normally freely trimming planing surface combination, means for setting an up trim angle of said freely trimming planing surface during take-off to help raise the wheel out of fluid and soft mediums, such as water, mud and the like, thereby reducing hydro-dynamic drag.

With these and other objects in view which will become apparent as the invention is fully understood, the same resides in the novelty of construction, combination and arrangement of elements hereinafter described in detail and distinctly claimed in the appended claims.

The description should be read in conjunction with the accompanying drawings, which for the sake of clarity leave off the variable control flaps of the prior co-pending application above referred to and wherein:

Figure 1 is a side elevational view of an aircraft schematically showing the up trim or "stern trim" the neutral trim and the down trim or "bow trim" of the planing units with respect to the fore and aft thrust line of the aircraft.

Fig. 2 is a fragmentary side elevational view of a fluid control arrangement for trim adjustment while the aircraft is either at rest or in flight.

Figure 3 is a side view similar to Figure 2, but showing the planing surface positioned at a down trim angle with respect to the thrust line of the aircraft.

Referring to Figures 1 and 2 of the drawing, there is shown an aircraft A and an undercarriage B. The undercarriage B included the usual shockproof landing struts 10 to each of which is suitably mounted a planing surface unit 12, such as a ski, hydro-ski or the like having an aspect ratio less than unity formed with a slot to surround a landing wheel C. As above stated these planing surface units are similar to the prior copending application structure except to omit the variable surface flaps and to be here shown slotted to receive the wheels C. Each planing surface unit pivotally connects to a landing strut 10 for trim by the stern or trim by the bow, that is, up trim or down trim by suitable means, such as transverse axle pin 14 extending through the end of a respective strut 10 and a pyramidal axle support 15.

It is to be understood that reference in this description to "trim angle" of the planing surface units is to be given the aeronautical definition. For example, the attitude of the planing surface units 12 relative to a fore and aft horizontal plane along the axis of the aircraft carrying the same. Thus, if the forward end is down, the unit is said to have "trim by the bow" and if the after end is down it is said to have "trim by the stern." With control of trim the pilot is able to change the attitude of the airplane or the undercarriage planing surface so as to provide the best aerodynamic angles to give better visibility during landing and take-off with respect to various surface mediums. Also controllable trim will provide a method of breaking free of snow and ice when the planing surface is frozen to a surface medium.

Each landing strut 10 comprises an upper section 16 fixed with respect to the aircraft and a section 17 telescopically movable within the fixed section to which the wheel C and planing surface or ski 12 is pivoted on the axle 14. A rigid rearwardly extending shaft 18 formed with an apertured end pivot pin 18' connecting with a piston shaft 19 is fixed to each upper strut section 16. The piston shaft 19 carries a piston, not shown, confined in fluid cylinder 20 connected at each end through conduits 21 and 22 to a control valve housing 23. The valve housing in turn is connected in the usual manner to a source of fluid supply by conduit 24 and the fluid return conduit 25. A valve operating handle 26 within easy reach of the pilot connects the fluid supply to either end of the fluid cylinder 20 by closing the fluid supply circuit between conduits 24—21 or 24—22. The base of the cylinder 20 is formed with a lug 27 pivotally connected to an upstanding center rib 28 of each respective planing unit 12, thus operation of the valve may move the cylinder in either an up or down direction with respect to the aircraft neutral trim thrust line, see Fig. 1, to change and fix the trim angle of the planing unit connected thereto or the planing unit may be left in neutral to permit the planing unit to trim freely for landing on a solid medium with the wheels C.

Operation: To adjust the trim angle of the planing unit 12 the pilot moves the operating handle 26 to a position such that the linkage connecting arm 18 to the rib 28 will be lengthened or shortened thus tilting the entire hydroski about its pivotal mounting on the strut 10 to the positions indicated by dash lines in Figure 1.

While the foregoing specification describes and the drawing illustrates only one form of control it can be seen that other forms may easily be applied, such as an electric motor and screw or a manual system of gears and screws could be used. Therefore, it is to be expressly understood that the invention is not limited to those details except as defined by the appended claims.

What is claimed is:

1. In an aircraft having a landing gear and a body, means comprising an undercarriage and at least one strut, said strut having a fixed section adapted to be secured to the aircraft body and a movable section telescopically mounted in the fixed section, a hydro-planing surface member having an aspect ratio less than unity, said member being pivoted intermediately of its ends on the end of the movable strut section, trim imparting linkage connecting said fixed strut section to the said member, power means interposed in said linkage connections for actuating said linkage, variable trim position control means for said power means, whereby power is imparted to move said linkage and said member to a selected trim angle, and pilot actuated means operatively associated with said trim position control means for adjusting the selected trim position angle for landing on water at high speeds prior to transition to a beach or a like solid medium.

2. An aircraft landing gear comprising strut means depending from the surface of an aircraft fuselage, a hydro-planing member pivotally connected to the end of the strut means, the member having a water planing surface, and a pilot operated remote control fluid actuated trim cylinder connected to the member for varying either the up-trim or the down trim of the member.

References Cited in the file of this patent

UNITED STATES PATENTS

| | | |
|---|---|---|
| 1,811,152 | Procofieff-Seversky | June 23, 1931 |
| 1,833,210 | Ditter | Nov. 24, 1931 |
| 1,963,630 | Procofieff-Seversky | June 19, 1934 |
| 2,073,864 | Brush | Mar. 16, 1937 |
| 2,085,295 | Campbell | June 29, 1937 |
| 2,106,934 | Saulnier | Feb. 1, 1938 |
| 2,263,800 | Dobson | Nov. 25, 1941 |
| 2,302,343 | Noorduyn | Nov. 17, 1942 |
| 2,340,080 | Ringnel | Jan. 25, 1944 |
| 2,532,610 | Ditter | Dec. 5, 1950 |

FOREIGN PATENTS

| | | |
|---|---|---|
| 746,058 | France | Feb. 27, 1933 |